United States Patent [19]

Rapp

[11] Patent Number: 4,539,544
[45] Date of Patent: Sep. 3, 1985

[54] DETENT MECHANISM FOR A HAND-OPERATED TRANSDUCER

[75] Inventor: Werner Rapp, Geislingen, Fed. Rep. of Germany

[73] Assignee: Starkstrom-Apparatebau GmbH, Fed. Rep. of Germany

[21] Appl. No.: 494,054

[22] Filed: May 12, 1983

[30] Foreign Application Priority Data

Jun. 30, 1982 [DE] Fed. Rep. of Germany ....... 3224386

[51] Int. Cl.³ ............................................. H01F 7/02
[52] U.S. Cl. ................................... 335/296; 335/253; 310/154
[58] Field of Search ............... 335/209, 272, 253, 296; 310/152, 156, 154

[56] References Cited

U.S. PATENT DOCUMENTS 3,375,512 3/1968 Watkins et al. ................. 335/272 X
3,934,216 1/1976 Ward .............................. 310/156 X
4,017,851 4/1977 Felice ............................. 335/272 X Primary Examiner—George Harris
Attorney, Agent, or Firm—Wigman & Cohen

[57] ABSTRACT

A detent mechanism for a manually activated transducer is disclosed in which the transducer element is movable along a predetermined path by means of a handle and includes a sensor for scanning markings on the transducer element and includes first and second components that determine the magnetic field in an air gap. These magnetic components have spaced, adjacent grooves directed in the direction of movement of the rotating transducer element. The magnetic forces created between these first and second components serve to hold the transducer element in one of a plurality of definite positions.

6 Claims, 2 Drawing Figures

DETENT MECHANISM FOR A HAND-OPERATED TRANSDUCER

BACKGROUND OF THE INVENTION

The present invention relates generally to a hand-operated transducer transmitter, emitter or impulse generator. More particularly, the present invention relates to an angular distance transducer, having a transducer element which can be moved along a predetermined path by means of a handle, a sensor which scans this transducer element and a detent mechanism which can be moved relative thereto in accordance with a movement of the transducer element such that the transducer element can be force-fittingly held in a plurality of definite positions.

In known angular distance transducers of this type, the transducer element is a rotatably mounted disc. The disc is provided with markings along its edge, which are read by an optical sensor during rotational movement of the disc to produce a signal proportional to the distance of angular rotation. In addition to this disc, a portion of the mechanical detent mechanism is arranged on the shaft supporting the disc and is provided, for example, with detent notches in which an elastic detent member of the other portion engages. This other portion is stationarily arranged in the transducer. Since, as a rule, the angle between two adjacent detent positions is very small and the number of positions in which the transducer element must be able to be locked is very large, this detent mechanism is relatively expensive. An additional significant disadvantage is that the detent mechanism is subject to wear.

SUMMARY AND OBJECTS OF THE INVENTION

In view of the foregoing, it should be apparent that there still exists a need in the art for a detant mechanism for use with a hand-operated transducer which is inexpensive and is not subject to wear.

More particularly, it is an object of this invention to provide a detent mechanism for use with a hand-operated transducer utilizing magnetic force to hold the transducer element in each detent position.

Another object of the present invention is to provide a detent mechanism for a hand-operated transducer which is simple in construction and reliable in operation.

Still another object of the present invention is to provide a detent mechanism for a transducer element which is not subject to wear.

A still further object of the present invention is to provide a detent mechanism for a transducer element which has a high degree of both precision in its positioning and the desired detent force.

Briefly described, these and other objects of the present invention are accomplished by a detent mechanism which holds the transducer element in each detent position exclusively by means of magnetic forces. Thus, direct contact between parts that are usually subject to wear is non-existant. The detent mechanism of the present invention thus has no parts which are subject to wear. Furthermore, the cost of the detent mechanism and therefore also for the transducer itself is low, because the magnetic current is guided through the two portions of the detent mechanism which can be simply designed and economically manufactured parts.

Additionally, a high degree of both precision in the positioning and the desired detent force can easily be achieved with the detent mechanism of the present invention. This is true because the increase of the magnetic return force, which opposes movement of the transducer element out of a selected detent position, need be only large enough to accomplish that purpose. The size of this force can be adapted to the necessary requirements by the geometry of the areas of the two components of the detent mechanism that determine the magnetic flux in the air gap and by the flux density, which is dependent upon the permanent magnets selected.

In a preferred embodiment, the areas of the two components of the detent mechanism that determine the magnetic field in the air gap have spaced, adjacent grooves in the direction of movement of the component which forms the second portion. These grooves can be economically manufactured even with relatively small dimensions and in close proximity to each other. Furthermore, in this manner, grooves can be provided like those commonly used for the transducer element. In this preferred embodiment, a positioning of the transducer element occurs in all positions where the teeth of one component are present between the adjacent grooves and are aligned with the teeth of the other component.

Since the increase of the magnetic return force at a given flux density in the air gap becomes greater as the number of teeth guiding the magnetic flux increases, the areas that determine the configuration of the magnetic field in the air gap advantageously extend over a plurality of grooves. In this manner, with even a relatively low flux density, i.e., a relatively weak permanent magent, a very precise detenting of the transducer element in the individual positions can be achieved. For technical manufacturing reasons, all such grooves and all such teeth preferably have the same width, respectively, as measured in the direction of movement of the components forming the second portion of the detent mechanism.

In the preferred embodiment, the transducer element is the component which forms the second portion of the detent mechanism. This is accomplished by making the transducer element of a magnetizable material, either completely or at least at the edges thereof. The grooves and teeth or the like to be provided along one edge can then be used for both the detenting in a plurality of definite positions and for the production of a signal. However, even when the transducer element, in addition to the markings necessary for the detenting, has markings in another area which can be read by the sensor and which may take the form of a code for example, the use of the transducer element as a component of the detent mechanism is very advantageous. By this means, the number of individual parts in the transducer is reduced even further. In addition, the axial length of the transducer element, and thus the space required therefor, can be reduced. It is also advantageous that no adjustment of the second component of the detent mechanism is necessary with respect to the transducer element.

Since the movement of the transducer element from one defined position to another changes the magnetic flux of the detent mechanism by changing the effective size of the air gap, a magnetic field-dependent sensor can also be provided to produce impulses. This sensor reacts to the magnetic flux of the detent mechanism and produces a signal upon each movement from one defined position into the next defined position. This movement either forms the impulse directly or is utilized as a basis from which an impulse can be obtained. The sensor and the detent mechanism are thereby joined in a single structural unit. This can result, for example, in a reduction of the structural size of the transducer.

If the transducer is an angular distance transducer, then it is preferable to form the transducer element as a rotatably mounted disk of a magnetizable material. The edge zones of the disk have grooves and teeth of equal size and angular displacement running radially with respect to the disk. A first component of the detent mechanism comprises two pole shoes which are fixedly mounted to the transducer. These pole shoes overlap the edge zones of the disk and have grooves and teeth somewhat similar to those on the disk. The grooves and teeth of the disk and pole shoes, together with a sensor which may be either optical or magnetic, are utilized to produce the desired impulses.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
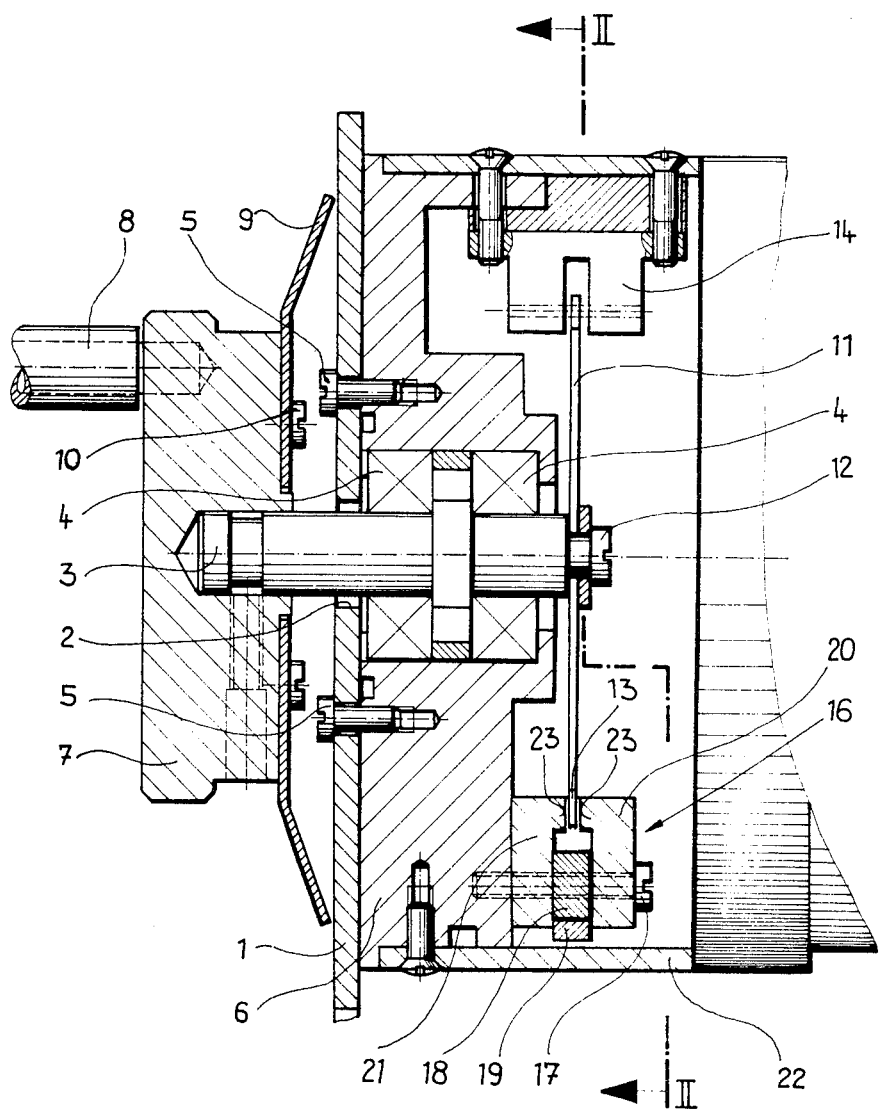
FIG. 1 is a diagram of a longitudinal section of a preferred embodiment of the present invention.

Referring now in detail to the drawings wherein like parts are designated by like reference numerals throughout, there is illustrated in FIG. 1 a manually activated angular distance transducer which includes a front plate 1 having a central opening 2 which accommodates a shaft 3. This shaft 3 is rotatably mounted in two roller bearings 4, which are axially spaced from each other and are inserted into and fixed in place in a support member 6. This support member 6 abuts against the back side of the front plate 1 and is connected thereto by means of screws 5.

The end portion of the shaft 3 projects beyond the forward side of the front plate 1 and supports a handwheel 7 with an eccentrically arranged crank 8. Coaxially to the shaft 3, an annular disc-like dial support 9 lies against the back side of the handwheel 7 facing the front plate 1. The handwheel 7 is connected with the shaft 3 so as to be axially immovable and to rotate together therewith. The dial support 9 is rigidly connected with the handwheel 7 by means of screws 10. The edge portion of the dial support 9 which projects beyond the handwheel 7 is bent toward the front plate 11 to such an extent that the outer edge is spaced from the front plate 1 by only a small distance. An annular portion of the dial support 9 adjacent the outer edge thereof is provided with a calibration scale, which is associated with one or more markings on the front plate 1. Of course, it would also be possible to provide the calibration scale on the front plate 1 and the associated markings on the dial support 9.

Figure 2:
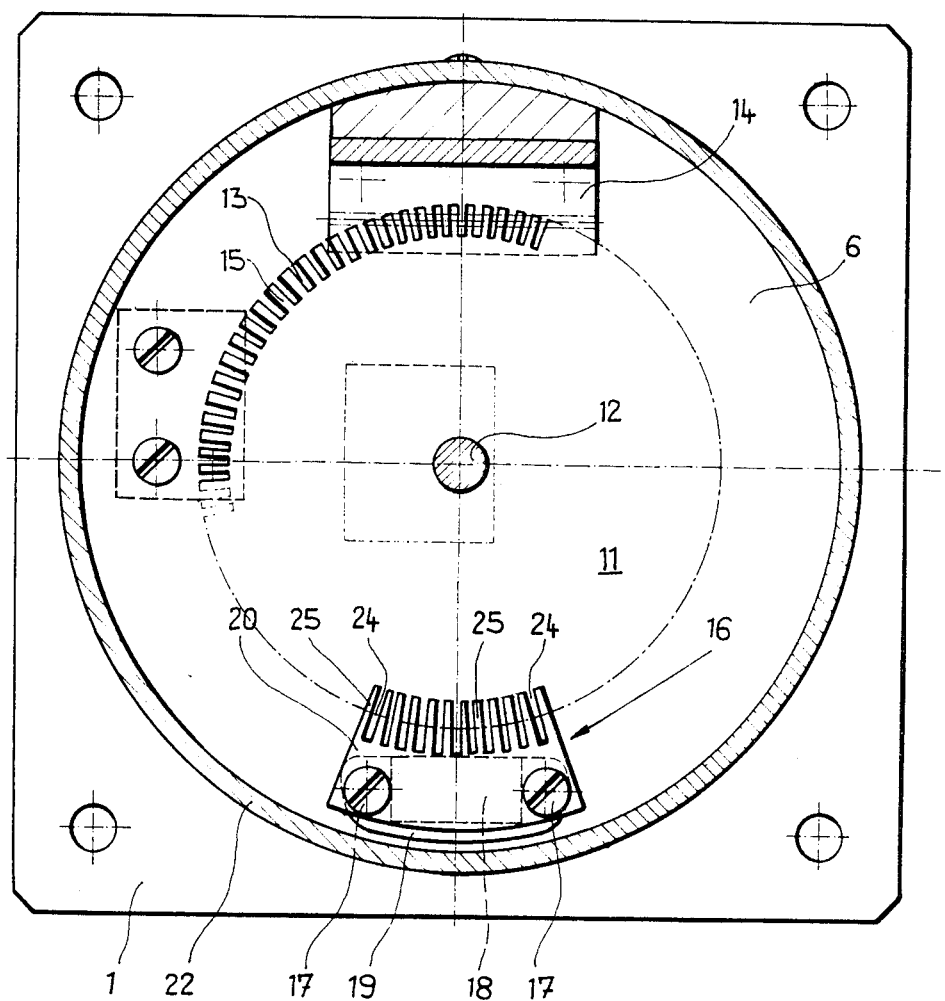
FIG. 2 is a diagram of a section taken along the line II—II of FIG. 1.

A disc 11, made from magnetizable sheet metal, is coaxially connected with the end of the shaft 3 which projects beyond the back side of the connecting member 6. In a preferred embodiment, a screw 12 is provided for this connection. This screw 12 penetrates a central bore of the disc 11, enters into a central longitudinal threaded bore in the shaft 3 and presses the disc 11 against the face of the shaft 3. As shown in FIG. 2, the disc 11 is provided along its entire periphery with radial grooves 13, all of which are the same size and have sides parallel to each other. Furthermore, the space between two adjacent grooves is always the same. In a preferred embodiment, the angle from the center of one groove to the center of the adjacent groove is 3°.

An optical sensor of known construction, designated generally as 14, uses light beams to read the edge zone of the disc 11. The edge zone consists of the grooves 13 and teeth 15 formed therebetween, all of which are of the same size and have the same angular displacement. In this manner, a rotational movement of the disc produces the desired impulses, from which both the direction of rotation and rotational angle can be determined.

Circumferentially displaced relative to the sensor 14, namely by 180° in the preferred embodiment, is a first component of a magnetic detent mechanism, designated generally with 16. This first component 16 is rigidly connected to the support member 6 by means of screws 17. The second component of this detent mechanism, which cooperates with the first component 16, is formed by the disc 11.

The first component 16 of the magnetic detent mechanism includes a rectangular permanent magnet 18, which is rigidly connected to a holding member 19 arranged at the side of and behind the permanent magnet 18. This permanent magnet 18 is magnetized in such a manner that the field lines leave and enter at the two surfaces lying parallel to the front plate 1 and the disc 3. Respective pole shoes 20 and 21 abut these two surfaces and are formed as mirror images of each other. As shown in FIG. 1, they have the outline shape of a ring section and are arranged in such a manner that lines extended from the two sides thereof intersect the longitudinal axis of the shaft 3. The inner side, which runs concentrically to the shaft 3, coincides at least approximately with the circular line on which the base of the grooves 13 lie. The outer edge, which also runs concentrically to the longitudinal axis of the shaft 3, has a sufficiently large distance from the center of the shaft 3, so that the permanent magnet 18, which is spaced from the outer edge of the disc 11, does not project radially outwardly beyond the pole shoes 20 and 21. In a preferred embodiment, only the plastic holding member 19 extends beyond this edge. It extends almost to a tubular housing wall 22, which is centered by the support member 6, is connected thereto and, in a preferred embodiment, serves as a support for the sensor 14.

As shown in FIG. 1, the two pole shoes 20 and 21 are arranged symmetrically with respect to the plane defined by the disc 11 and overlap the edge area of the disc 11 provided with the grooves 13. The pole shoes 20 and 21 have at this edge area a portion of material which projects toward the disc 11. This projecting material establishes an air gap 23 between each of the two pole shoes 20 and 21 and the disc 11 at a desired value of, for example, a few tenths of a millimeter. Each projecting material portion, the surfaces of which facing the disc 11 lie parallel to the disc 11, has a width measured in the radial direction of the disc 11 corresponding approximately to the depth of the grooves 13. The inner surfaces facing the shaft 3 are aligned with the corresponding surface of the associated pole shoe, and the surfaces of these projecting material portions opposite the shaft 3 at least approximately align with the outer edge of the disc 11.

As shown particularly in FIG. 2, the areas of both pole shoes 20 and 21 facing grooves 13 of the disc 11, which areas are ring section shaped and include the projecting material portions, extend in the circumferential direction of the disc 11 over an area of several grooves 13. In a preferred embodiment, this area includes eleven grooves. Furthermore, as shown in FIG. 2, this area of both pole shoes 20 and 21 is also provided with grooves 24, which extend radially from the inner edge of the pole shoe toward its outer edge and have a depth about twice as large as the depth of the grooves 13. The disc 11 can thereby be adjusted in angular positions in which the grooves 24 align with the grooves 13 and the teeth 15 align with the teeth lying between the grooves 24.

Since the magnetic flux is led across a plurality of teeth 15 and 25, the increase in the magnetic return force as the disc 11 is rotated out of a position where the teeth are aligned with each other is so steep that even with a relatively small flux density in the air gap 23, an exact force-closed arresting of the disc 11 in the defined positions is achieved.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A detent mechanism for a manually activated transducer, particularly an angular distance transducer, in which the transducer element is movable along a predetermined path by means of a handle and which includes a sensor for scanning markings on the transducer element, said detent mechanism comprising:

fixed first magnetic means including at least one permanent magnet with two pole shoes which form an air gap between them;

second magnetic means spaced apart from and being movable with respect to said fixed first magnetic means for cooperating therewith such that said transducer element can be located by magnetic force in one of a plurality of definite positions;

said second magnetic means is a rotatably mounted disc of a magnetizable material, the edge zone of which, like the portion of the two pole shoes overlapping said edge zone, has a plurality of grooves and teeth of the same size and angular displacement, running radially with respect to the rotational axis of the disc;

at least one air gap formed between said first and second magnetic means across which said magnetic means cooperate with each other without physically contacting each other;

said first and second magnetic means being constructed of a predetermined shape so that the configuration of the magnetic field in the air gap is such that a smaller effective air gap is created when said first and second magnetic means correspond to said one of a plurality of definite positions of the transducer element than when in other positions and the first and second magnetic means which determine the magnetic field in the air gap include adjacent, spaced grooves spaced in the direction of movement of the second magnetic means; and all of said grooves have the same width and the teeth formed between two adjacent grooves also have the same width, measured respectively in the direction of movement of the second magnetic means.

2. The detent mechanism of claim 1, wherein that portion of the first and second magnetic means which determine the configuration of the magnetic field in the air gap extends over a plurality of grooves.

3. The detent mechanism of claim 2, wherein said plurality of grooves is at least ten grooves.

4. The detent mechanism of claim 1, wherein said second magnetic means forms the transducer element.

5. The detent mechanism of claim 4, wherein the grooves and the teeth of the transducer element which determine the configuration of the magnetic field in the air gap constitute the markings of said transducer element which are scanned by the sensor.

6. The detent mechanism of claim 1, wherein the transducer is a magnetic field-dependent signal transducer which lies in the magnetic flow of said fixed first magnetic means.

* * * * *